United States Patent [19]

Andrews et al.

[11] Patent Number: 4,618,084
[45] Date of Patent: Oct. 21, 1986

[54] OPTICAL FIBRE CUTTING TOOL

[75] Inventors: Patrick V. Andrews, Datchet; Edward Z. Kaczmarski, London, both of England

[73] Assignee: BICC Public Limited Company, London, England

[21] Appl. No.: 744,386

[22] Filed: Jun. 13, 1985

[30] Foreign Application Priority Data

Jun. 14, 1984 [GB] United Kingdom ................. 8415167

[51] Int. Cl.⁴ ............................................ C03B 37/16
[52] U.S. Cl. ..................................... 225/96; 225/101; 225/106
[58] Field of Search .................... 225/2, 96, 96.5, 101, 225/105, 106

[56] References Cited

U.S. PATENT DOCUMENTS

| 4,118,862 | 10/1978 | Hensel | 225/2 X |
| 4,154,385 | 5/1979 | Lewis | 225/2 X |
| 4,202,475 | 5/1980 | Hirai et al. | 225/96.5 X |
| 4,503,744 | 3/1985 | Garner et al. | 225/96 X |

Primary Examiner—Frank T. Yost
Attorney, Agent, or Firm—Anthony J. Casella; Gerald E. Hespos

[57] ABSTRACT

A hand tool for providing an optical fibre with an end face which is flat and lies in a plane radial to the fibre axis comprises four elongate members extending side by side. The first member is of tubular form and surrounds the other three members and has, mounted near one of its ends, jaws of two pairs of jaws transversely spaced on opposite sides of the longitudinal axis of the member and, between the jaws, a table having a curved surface. The second member is pivotally connected to the first member at its end remote from the table about an axis extending transversely of the members, is urged away from an internal surface of the first member by a leaf spring and carries, near its other end, the other jaws of the transversely spaced pairs of jaws. The jaws of one pair of jaws are mounted to exert a tensile force on the fibre. The third member is pivotally connected to the first member at its end remote from the table about an axis extending transversely of the members, is urged away from the first member by the leaf spring and carries near its other end an elongate cutter. The fourth member is pivotally connected at one of its ends to the first member and has an intermediate part that causes the third and second members to pivot against the action of the leaf spring.

11 Claims, 5 Drawing Figures

OPTICAL FIBRE CUTTING TOOL

This invention relates to a hand tool for providing an optical fibre with an end face that is substantially flat and lies in a plane radial to the axis of the fibre so that when the optical fibre is jointed or spliced to another optical fibre with a similar end face light losses at the joint or splice are as low as possible.

In the Complete Specification of our British Pat. No. 1519232, there is described and claimed a hand tool for this purpose comprising at least two members inter-connected in such a way that at least one of the members is constrained to move in a direction towards or away from the other member or members; a table having a curved surface carried on one of the members, the centres of curvature of the curved surface lying on an axis substantially normal to said direction of movement of the member or members; an elongate cutter associated with the table and mounted on the other or another of the members, the cutting edge of the cutter being substantially normal to tangents of the curved surface of the table; and two pairs of jaws transversely spaced on opposite sides of the table and cutter, one jaw of each pair being mounted on one member and one jaw of each pair being mounted on the other or another member. The arrangement is such that when an optical fibre is positioned between the jaws of the pairs of jaws so that it lies across the curved surface of the table substantially normal to the cutting edge of the cutter, and the member or members is or are caused to move towards the other member or members to cause the pairs of jaws to grip the optical fibre, at least one pair of the pairs of jaws applies a tensile force to the optical fibre to stretch it across the curved surface of the table and the cutting edge contacts and is caused to move transversely across the optical fibre to score the fibre to such an extent that the tensioned fibre breaks to form end faces of the fibre that are substantially flat and lie in planes radial to the axis of the fibre.

The jaws of one of the pairs of jaws are preferably both so resiliently mounted on the members that, when the jaws move towards one another to grip an optical fibre between them, the parts of the jaws in contact with the fibre tend to move away from the table and from the other pair of jaws thereby exerting a tensile force on the fibre in a direction substantially normal to the cutting edge.

A hand tool as described and claimed in our aforesaid patent in which the jaws of one of the pairs of jaws are both so resiliently mounted on the members that, when the jaws move towards one another to grip an optical fibre between them, the parts of the jaws in contact with the fibre tend to move away from the table in a direction substantially normal to the cutting edge to effect said tensile force on the fibre will, for convenience, hereinafter be referred to as "a hand tool of the kind described".

It is an object of the present invention to provide an improved hand tool of the kind described which is especially suitable for use in cutting a single mode optical fibre and which can be readily used in the field by semi-skilled or unskilled personnel.

According to the invention, the improved hand tool comprises four elongate members extending side by side; the first of which elongate members is of substantially tubular form and surrounds the other three elongate members and has, mounted on the member at or near one of its ends, one jaw of each of two pairs of jaws tranversely spaced on opposite sides of the longitudinal axis of the member and, between said jaws, a table having a curved surface whose axes of curvature lie on a rectilinear axis extending lengthwise of the member; the second of which elongate members is pivotally connected to the tubular first member at its end remote from the table about an axis extending transversely of the members, is urged away from an internal surface of the tubular first member by spring means and carries, at or near its other end, the other jaw of each of said transversely spaced pairs of jaws, the jaws of one pair of the pairs of jaws being so shaped and/or resiliently mounted on the first and second members that, when the jaws move towards one another to grip an optical fibre between them, the parts of the jaws in contact with the fibre will tend to move away from the table and from the other pair of jaws to effect a tensile force on the fibre; the third of which elongate members is pivotally connected to the tubular first member at its end remote from the table about an axis extending transversely of the members, is urged away from the second member by said spring means and carries at or near its other end an elongate cutter having a cutting edge which is substantially normal to tangents of the curved surface of the table; and the fourth of which elongate members is pivotally connected at one of its ends to the tubular first member about an axis extending transversely of the members and is so shaped intermediate of its ends that, when it is caused to pivot towards the third and second members, an intermediate part of said fourth member bears against the third member to cause the second and third members to pivot against the action of said spring means and so cause the jaws of the pairs of jaws to grip an optical fibre positioned therebetween and to cause the cutting edge to contact and move transversely across the tensioned optical fibre to score the fibre to such an extent that the fibre breaks to form end faces of the fibre that are substantially flat and lie in planes radial to the axis of the fibre.

Preferably, the fourth member carries at or near one of its ends a button which protrudes through a hole in the wall of the tubular first member and which can be pressed by an operator to cause the fourth member to pivot towards the third member so that the intermediate part of the fourth member bears against the third member.

We have found that, since pivotal movement of the third member carrying the cutter is effected by inter-engagement between the intermediate part of the fourth member and the third member, the manner and/or force with which an operator effects pivotal movement of the fourth member does not have any deleterious effect on pivotal movement of the third member. As a result, substantially no forces are transmitted to the third member in a direction transverse to the third member or in such a direction as to tend to twist the third member. Furthermore, the significant mechanical advantage of the arrangement gives better control of the force necessary, and reduces the muscular effort required, to operate the hand tool. Thus, for substantially all operators of the improved hand tool of the present invention, the hand tool will score an optical fibre to such an extent that the tensioned fibre breaks to form end faces of the fibre that are substantially flat and lie in planes radial to the axis of the fibre.

Preferably, the elongate cutter is carried by a supplementary member which is detachably secured to the third member in such a way that the cutting edge of the cutter can be adjusted with respect to the associated table in a direction substantially parallel to the cutting edge. This arrangement has two important advantages; firstly, during the life of the hand tool, the elongate cutter can be adjusted with respect to the table in a direction substantially parallel to its cutting edge to ensure that, during the life of the cutter, substantially the whole length of the cutting edge is used and, secondly, when desired an elongate cutter can readily be replaced by another elongate cutter.

The elongate cutter is preferably carried by a strip of resilient metal which extends in a direction substantially parallel to the cutting edge of the cutter and which is secured at each of its ends to the supplementary member. The strip of resilient metal is preferably so shaped that, as the third member is caused to pivot and the cutting edge of the elongate cutter is caused to contact an optical fibre stretched across the curved surface of the table, the cutting edge is caused to move across the optical fibre to score the optical fibre.

Preferably, the jaws of one of the pairs of jaws are resiliently mounted on the first and second members by leaf springs so orientated that the pair of jaws cannot move with respect to the table in a direction substantially normal to the cutting edge and the jaws of the other of the pairs of jaws are resiliently mounted on the first and second members by leaf springs inclined at such an angle to the leaf springs of the jaws of the first pair of jaws that, when the jaws move towards one another to grip an optical fibre between them, the parts of the jaws in contact with the fibre tend to move away from the table and from the first pair of jaws.

In a preferred embodiment, each of the pairs of jaws has associated optical fibre guide means which is positioned adjacent the pair of jaws and remote from the table. Each of the optical fibre guide means preferably includes a substantially flat support surface having, extending substantially normal to the cutting edge of the elongate cutter, a step or shoulder against which an optical fibre, to be positioned between the jaws of the pairs of jaws, can be laid. If desired, the support surface of each of the optical fibre guide means may have two or more steps or shoulders extending substantially normal to the cutting edge of the elongate cutter to provide for simultaneous scoring of two or more optical fibres. Preferably, the support surface of the optical fibre guide means associated with the pair of jaws which cannot move with respect to the table in a direction substantially normal to the cutting edge of the elongate cutter carries spring loaded clamp means for clamping an optical fibre against the step or shoulder on the surface.

The optical fibre guide means are preferably carried by a separately formed elongate member which extends transversely of and is permanently or detachably secured to the first elongate member.

The table is preferably so detachably secured to the tubular first member that its position with respect to the pairs of jaws can be adjusted in a direction substantially parallel to the cutting edge of the elongate cutter.

The invention is further illustrated by a description, by way of example, of a preferred hand tool which is especially suitable for providing a single mode optical fibre with an end face that is substantially flat and lies in a plane radial to the axis of the fibre, with reference to the accompanying drawings, in which.

Figure 1:
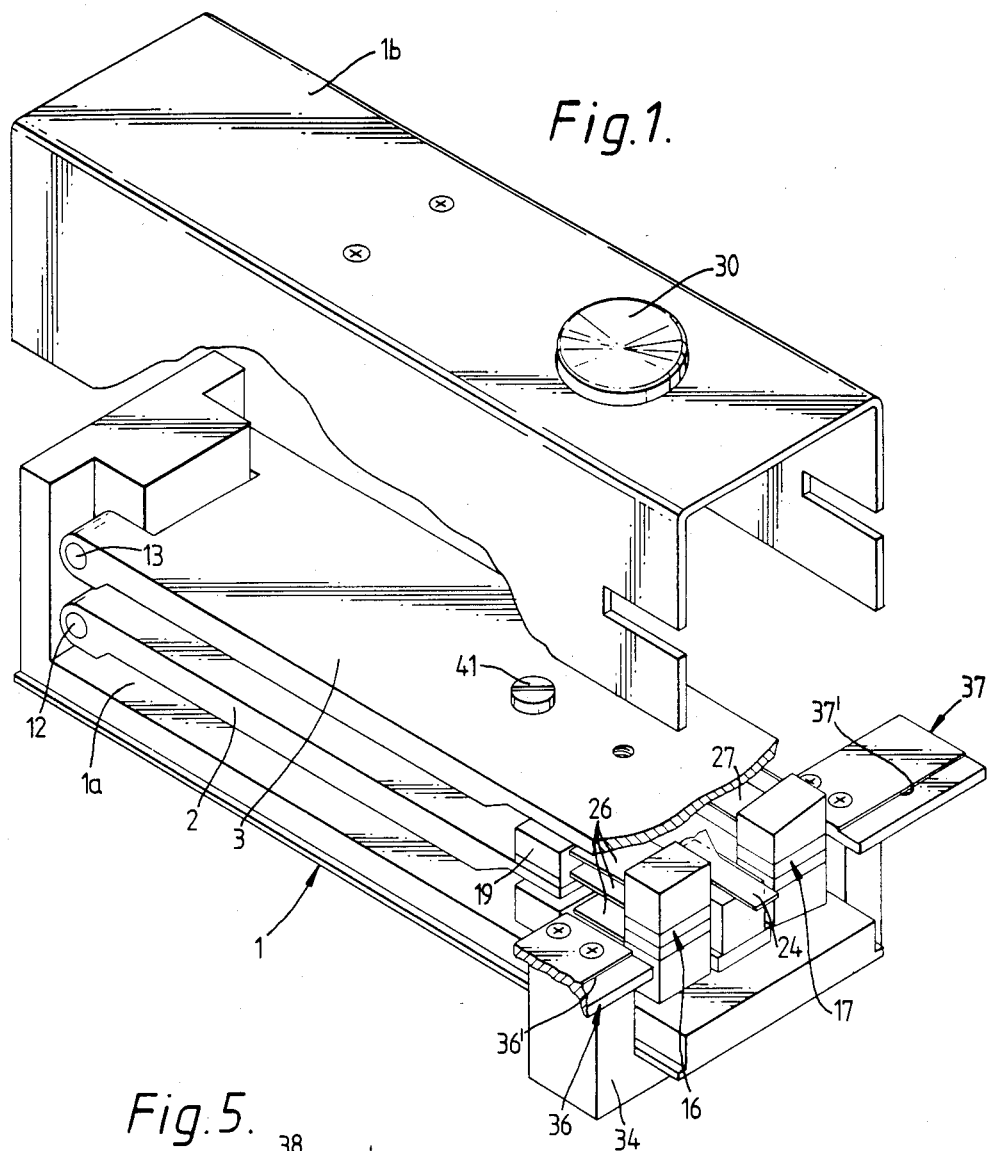
FIG. 1 is an exploded fragmental isometric view of the preferred hand tool.

Referring to FIGS. 1 to 4, the preferred hand tool comprises four major components, namely a first elongate member 1 of tubular cross-section consisting of an elongate base member 1a and, detachably secured to the base member, a separately formed elongate cover member 1b; a second elongate member 2 which at one of its ends is pivotally connected to the elongate base member 1a about an axis 12 extending transversely of the members; a third elongate member 3 which at one of its ends is pivotally connected to the base member 1a about an axis 13 extending transversely of the members; and a fourth elongate member 4 which is pivotally connected to the undersurface of the cover member 1b at a position intermediate of the ends of the cover member about an axis 14 extending transversely of the members.

Mounted at or near the end of the elongate base member 1a remote from the pivotal axes 12 and 13 is a table 6 having curved surface 7, the centres of curvature of which lie on an axis substantially normal to the pivotal axes 12 and 13. The table 6 is detachably secured to the elongate base member 1a by screws 8 so that its position with respect to the elongate base member can be adjusted in a direction substantially normal to the pivotal axes 12 and 13. Also mounted on the elongate base member 1a at the end remote from the pivotal axes 12 and 13 on opposite sides of the table 6 are one jaw 16', 17' of each of two pairs 16, 17 of jaws for gripping an optical fibre positioned across the table. The other jaws 16", 17" of the pairs 16, 17 of jaws are carried at or near the neighbouring end of the second elongate member 2. The jaws 16', 16" of the pair 16 of jaws are resiliently mounted, respectively, on the base member 1a and second elongate member 2 by leaf springs 26 so orientated that the pair of jaws cannot move with respect to the table 6 in a direction substantially parallel to the pivotal axes 12 and 13. The jaws 17', 17" of the pair 17 of jaws are each so shaped and resiliently mounted, respectively, on the base member 1a and second elongate member 2 by leaf springs 27 inclined at an angle to leaf springs 26, that, when the jaws move towards one another to grip an optical fibre between them, the parts of the jaws in contact with the fibre tend to move away from the table 6 and from the other pair 16 of jaws thereby exerting a tensile force on the fibre in a direction transverse to the longitudinal axis of the hand tool.

The third elongate member 3 has detachably secured to its end remote from the pivotal axis 13 a supplementary member 23 to the undersurface of which is attached a strip 24 of resilient metal which extends in a direction lengthwise of the hand tool and to the undersurface of which is secured an elongate cutter 25 whose cutting edge is normal to tangents of the curved surface 7 of the table 6. The supplementary member 23 is so detachably secured to the third member 3 by screws 28 that the cutting edge of the cutter 25 can be adjusted with respect to the table 6 in a direction parallel to the cutting edge.

The fourth elongate member 4 carries at its end remote from the pivotal axis 14 a button 30 which protrudes through a hole 31 in the cover member 1b and which can be pressed by an operator to cause the fourth member to pivot towards the third member so that an intermediate part 32 of the fourth elongate member bears against the third elongate member 3 to cause the third elongate member and the second elongate member 2 to pivot against the action of leaf spring 18. The third elongate member 3 carries a screw 44 which depends downwardly between the bodies 19 and through a hole in the second elongate member 2 and which, when the third and second elongate members are caused to pivot against the action of leaf spring 18, will abut a fine adjustment screw 45 upstanding from the base member 1a and by means of which the depth of score effected in an optical fibre by the cutter 25 can be finely adjusted.

Each of the pairs 16, 17 of jaws has an associated optical fibre guide 36, 37 which is positioned adjacent the pairs of jaws and remote from the table 6 and which is carried by a separately formed elongate member 34 which extends transversely of and is detachably secured to the base member 1a. Each optical fibre guide 36, 37 includes a flat support surface having, extending substantially normal to the cutting edge of the elongate cutter 25, a shoulder 36', 37' against which an optical fibre, to be positioned between the jaws of the pairs 16, 17 of jaws, can be laid.

Figure 5:
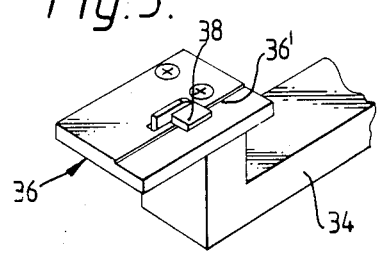
FIG. 5 is a fragmental perspective view of one preferred form of optical fibre guide means for use in the preferred hand tool.
Figure 2:
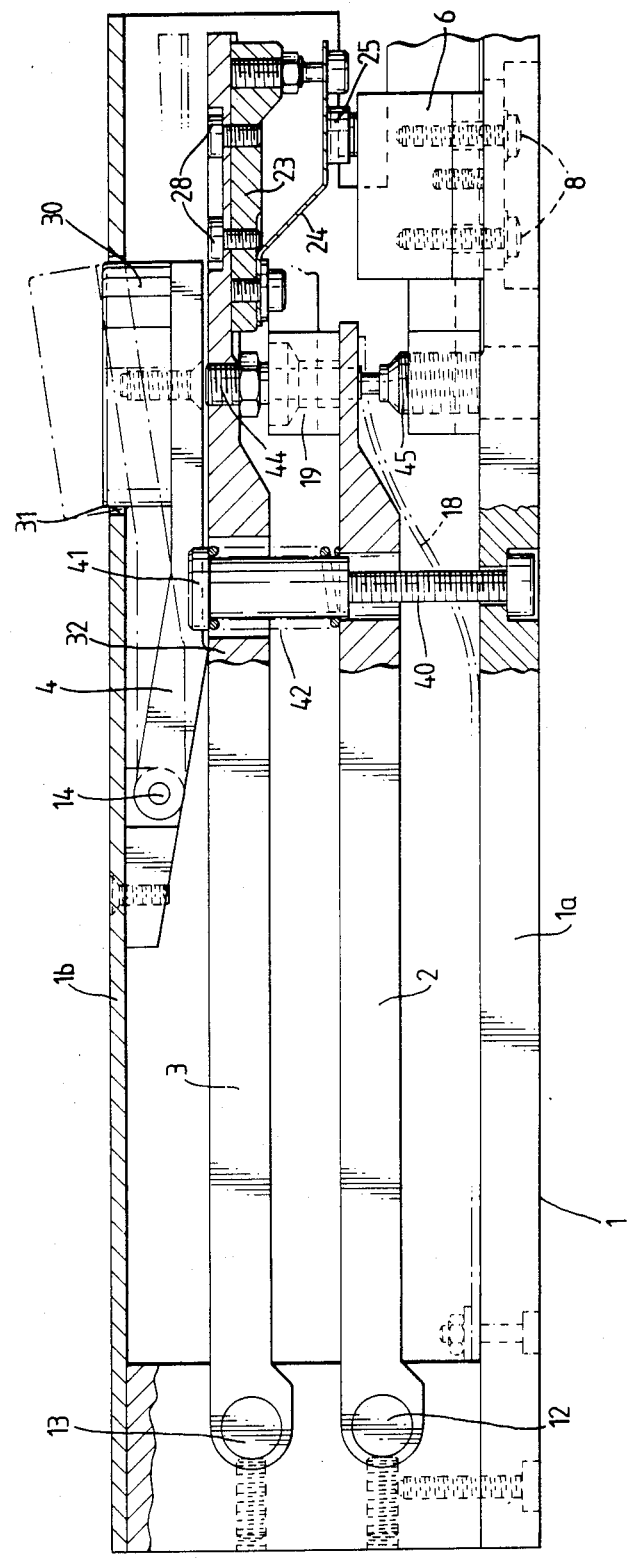
FIG. 2 is a side view of the preferred hand tool, partly in section and partly in elevation.
Figure 3:
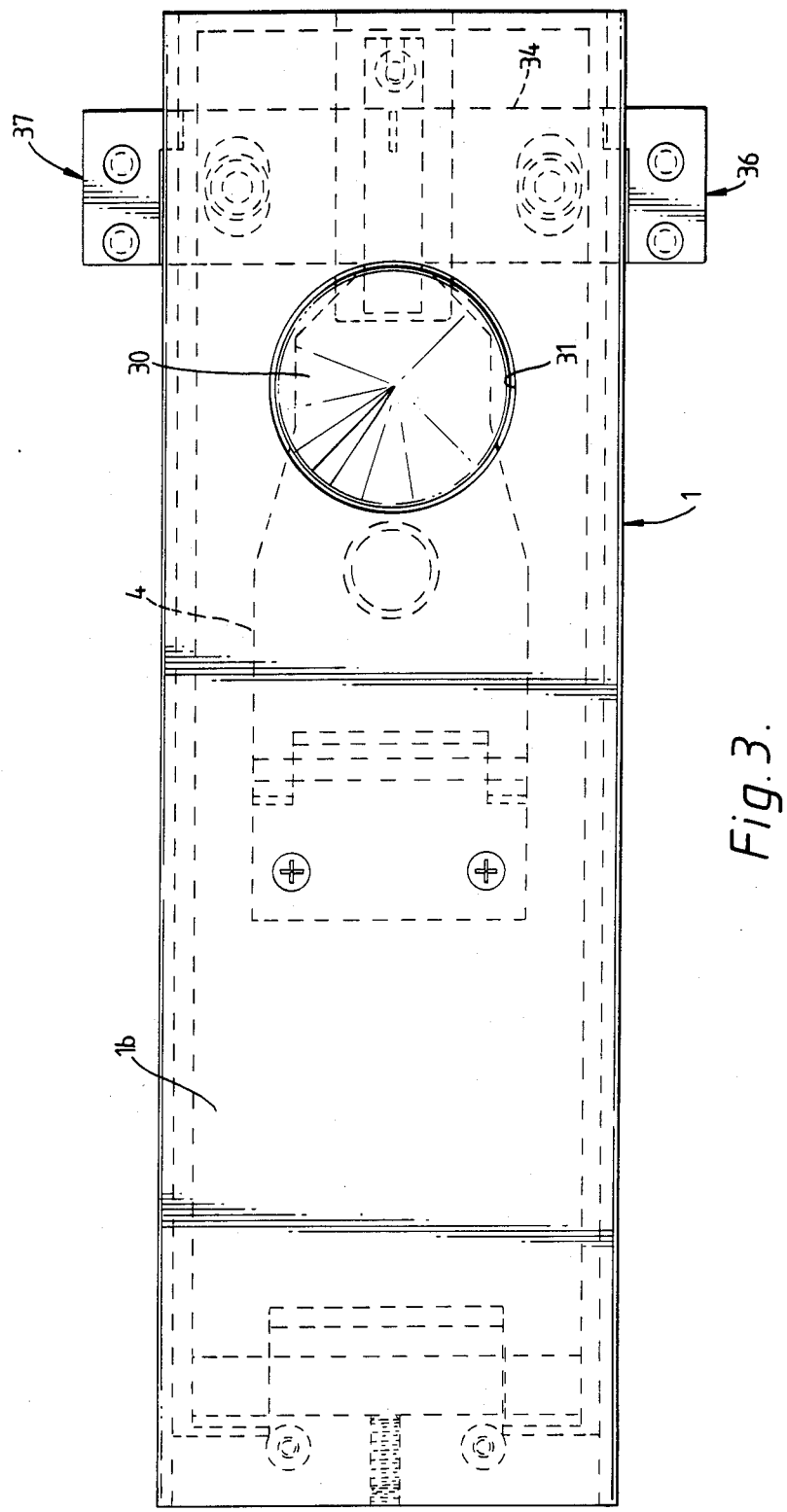
FIG. 3 is a plan view of the preferred hand tool.
Figure 4:
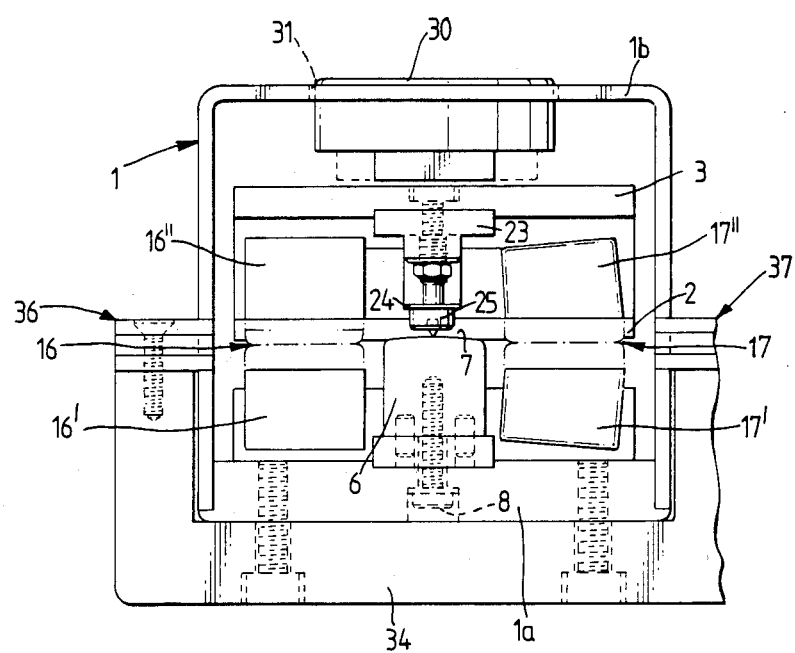
FIG. 4 is a fragmental front end view of the preferred hand tool.

Preferably, as is illustrated in FIG. 5, the optical fibre guide means 36 carries a spring loaded clamp 38 by means of which an optical fibre is clamped to, and against the shoulder 36' of, the guide.

What we claim as our invention is:

1. A hand tool for providing an optical fibre with an end face that is substantially flat and lies in a plane radial to the axis of the fibre, which hand tool comprises four elongate members extending side by side; the first of which elongate members is of substantially tubular form and surrounds the other three elongate members and has, mounted on the member near one of its ends, one jaw of each of two pairs of jaws transversely spaced on opposite sides of the longitudinal axis of the member and, between said jaws, a table having a curved surface whose axes of curvature lie on a rectilinear axis extending lengthwise of the member; the second of which elongate members is pivotally connected to the tubular first member at its end remote from the table about an axis extending transversely of the members, is urged away from an internal surface of the tubular first member by spring means and carries, near its other end, the other jaw of each of said transversely spaced pairs of jaws, the jaws of one pair of the pairs of jaws being so resiliently mounted on the first and second members that, when the jaws move towards one another to grip an optical fibre between them, the parts of the jaws in contact with the fibre will tend to move away from the table and from the other pair of jaws to exert a tensile force on the fibre; the third of which elongate members is pivotally connected to the tubular first member at its end remote from the table about an axis extending transversely of the members, is urged away from the second member by said spring means and carries near its other end an elongate cutter having a cutting edge which is substantially normal to tangents of the curved surface of the table; and the fourth of which elongate members is pivotally connected at one of its ends to the tubular first member about an axis extending transversely of the members and is so shaped intermediate of its ends that, when it is caused to pivot towards the third and second members, an intermediate part of said fourth member bears against the third member to cause the second and third members to pivot against the action of said spring means and so cause the jaws of the pairs of jaws to grip an optical fibre positioned therebetween and to cause the cutting edge to contact and move transversely across the tensioned optical fibre to score the fibre to such an extent that the fibre breaks to form end faces of the fibre that are substantially flat and lie in planes radial to the axis of the fibre.

2. A hand tool as claimed in claim 1, wherein the fourth member carries near one of its ends a button which protrudes through a hole in the wall of the tubular first member and which can be pressed by an operator to cause the fourth member to pivot towards the third member so that the intermediate part of the fourth member bears against the third member.

3. A hand tool as claimed in claim 1, wherein the elongate cutter is carried by a supplementary member which is detachably secured to the third member in such a way that the cutting edge of the cutter can be adjusted with respect to the associated table in a direction substantially parallel to the cutting edge.

4. A hand tool as claimed in claim 3, wherein the elongate cutter is carried by a strip of resilient metal which extends in a direction substantially parallel to the cutting edge of the cutter and which is secured at each of its ends to the supplementary member.

5. A hand tool as claimed in claim 4, wherein the strip of resilient metal is so shaped that, as the third member is caused to pivot and the cutting edge of the elongate cutter is caused to contact an optical fibre stretched across the curved surface of the table, the cutting edge is caused to move across the optical fibre to score the optical fibre.

6. A hand tool as claimed in claim 1, wherein the jaws of one of the pairs of jaws are resiliently mounted on the first and second members by leaf springs so orientated that the pair of jaws cannot move with respect to the table in a direction substantially normal to the cutting edge of the cutter and the jaws of the other of the pairs of jaws are resiliently mounted on the first and second members by leaf springs inclined at such an angle to the leaf springs of the jaws of the first pair of jaws that, when the jaws move towards one another to grip an optical fibre between them, the parts of the jaws in contact with the fibre tend to move away from the table and from the first pair of jaws.

7. A hand tool as claimed in claim 6, wherein each of the pairs of jaws has associated optical fibre guide means which is positioned adjacent the pair of jaws and remote from the table.

8. A hand tool as claimed in claim 7, wherein each of the optical fibre guide means includes a substantially flat support surface having, extending substantially normal to the cutting edge of the elongate cutter, at least one shoulder against which an optical fibre, to be positioned between the jaws of the pairs of jaws, can be laid.

9. A hand tool as claimed in claim 8, wherein the support surface of the optical fibre guide means associated with the pair of jaws which cannot move with respect to the table in a direction substantially normal to the cutting edge of the elongate cutter carries spring loaded clamp means for clamping an optical fibre against the shoulder on the surface.

10. A hand tool as claimed in claim 7, wherein the optical fibre guide means are carried by a separately formed elongate member which extends transversely of and is secured to the tubular first elongate member.

11. A hand tool as claimed in claim 1, wherein the table is so detachably secured to the tubular first member that its position with respect to the pairs of jaws can be adjusted in a direction substantially parallel to the cutting edge of the elongate cutter.

* * * * *